(12) United States Patent
Mehta et al.

(10) Patent No.: US 7,583,939 B2
(45) Date of Patent: Sep. 1, 2009

(54) METHOD AND SYSTEM FOR ANTENNA SELECTION IN WIRELESS NETWORKS

(75) Inventors: Neelesh B. Mehta, Needham, MA (US); Erdem Bala, Cambridge, MA (US); Jinyun Zhang, Cambridge, MA (US); Andreas F. Molisch, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 491 days.

(21) Appl. No.: 11/620,105

(22) Filed: Jan. 5, 2007

(65) Prior Publication Data

US 2008/0051149 A1    Feb. 28, 2008

Related U.S. Application Data

(60) Provisional application No. 60/839,366, filed on Aug. 22, 2006.

(51) Int. Cl.
*H03C 7/02* (2006.01)
*H04B 7/02* (2006.01)

(52) U.S. Cl. .................. 455/91; 455/101; 455/562.1; 375/267; 375/299

(58) Field of Classification Search ............... 455/101, 455/562.1; 375/267, 299
See application file for complete search history.

(56) References Cited

U.S. PATENT DOCUMENTS

| | | | |
|---|---|---|---|
| 6,252,864 B1 * | 6/2001 | Hayashi | 370/335 |
| 6,600,934 B1 * | 7/2003 | Yun et al. | 455/562.1 |
| 7,027,523 B2 * | 4/2006 | Jalali et al. | 375/296 |
| 7,471,702 B2 * | 12/2008 | Laroia et al. | 370/491 |
| 7,539,458 B2 * | 5/2009 | Jafarkhani et al. | 455/63.1 |
| 2006/0115014 A1 * | 6/2006 | Jeong et al. | 375/267 |
| 2008/0063116 A1 * | 3/2008 | Yokoyama | 375/299 |

FOREIGN PATENT DOCUMENTS

| | | |
|---|---|---|
| WO | WO 01/71940 | 9/2001 |
| WO | WO 2005/034387 | 4/2005 |

* cited by examiner

*Primary Examiner*—Simon D Nguyen
(74) *Attorney, Agent, or Firm*—Dirk Brinkman; Gene Vinokur

(57) ABSTRACT

A method and system selects a subset of antennas from a set of antennas to transmit user data in a wireless communication system. The user data is transmitted during a first transmission time intervals (TTI) using a first subset of antennas. Pilot tones are transmitted during a second TTI using a second subset of antennas. Corresponding channel qualities are estimated for the first subset of antennas and the second subset of antennas from the user data and the pilot tones. Then, based on the estimating, a best subset of antenna is selected from the first subset of antennas and the second subset of antennas to transmit the user data during a subsequent TTI.

22 Claims, 20 Drawing Sheets

10

20

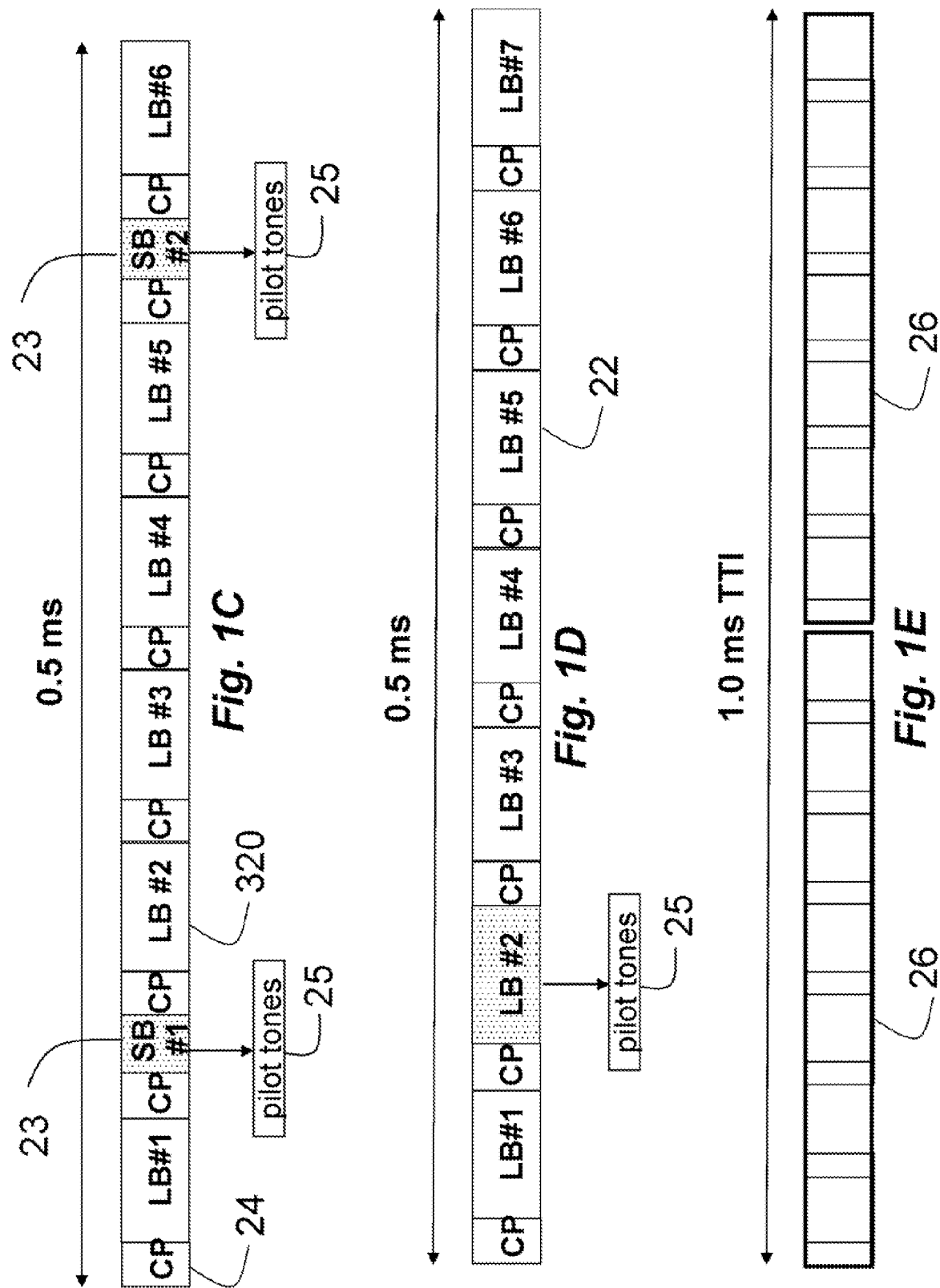

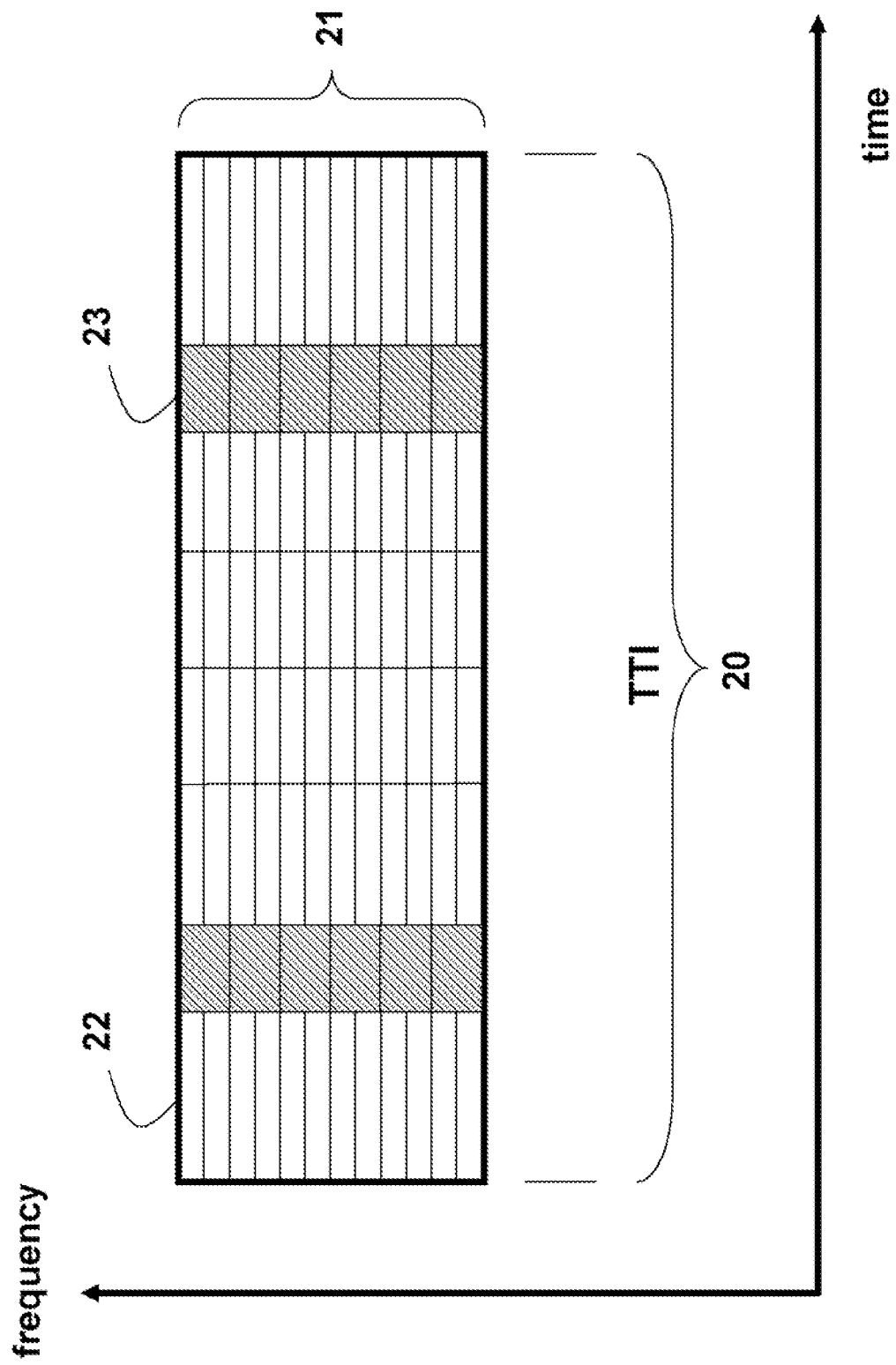

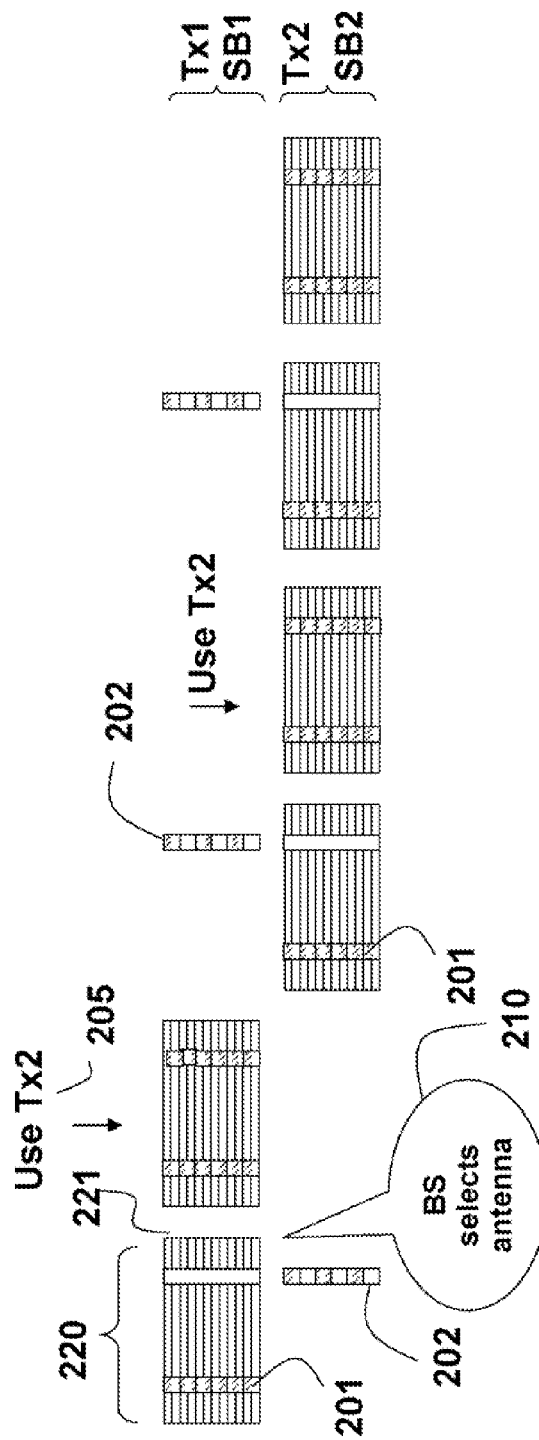
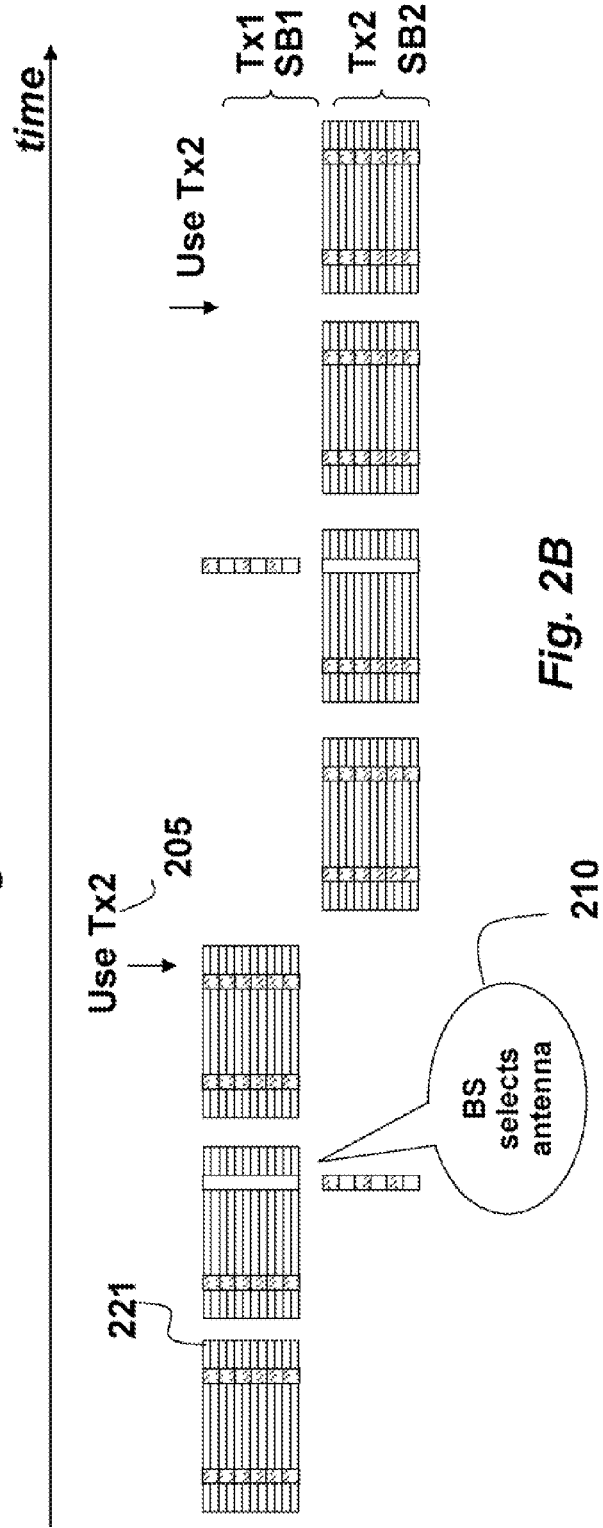
Fig. 2A
Fig. 2B

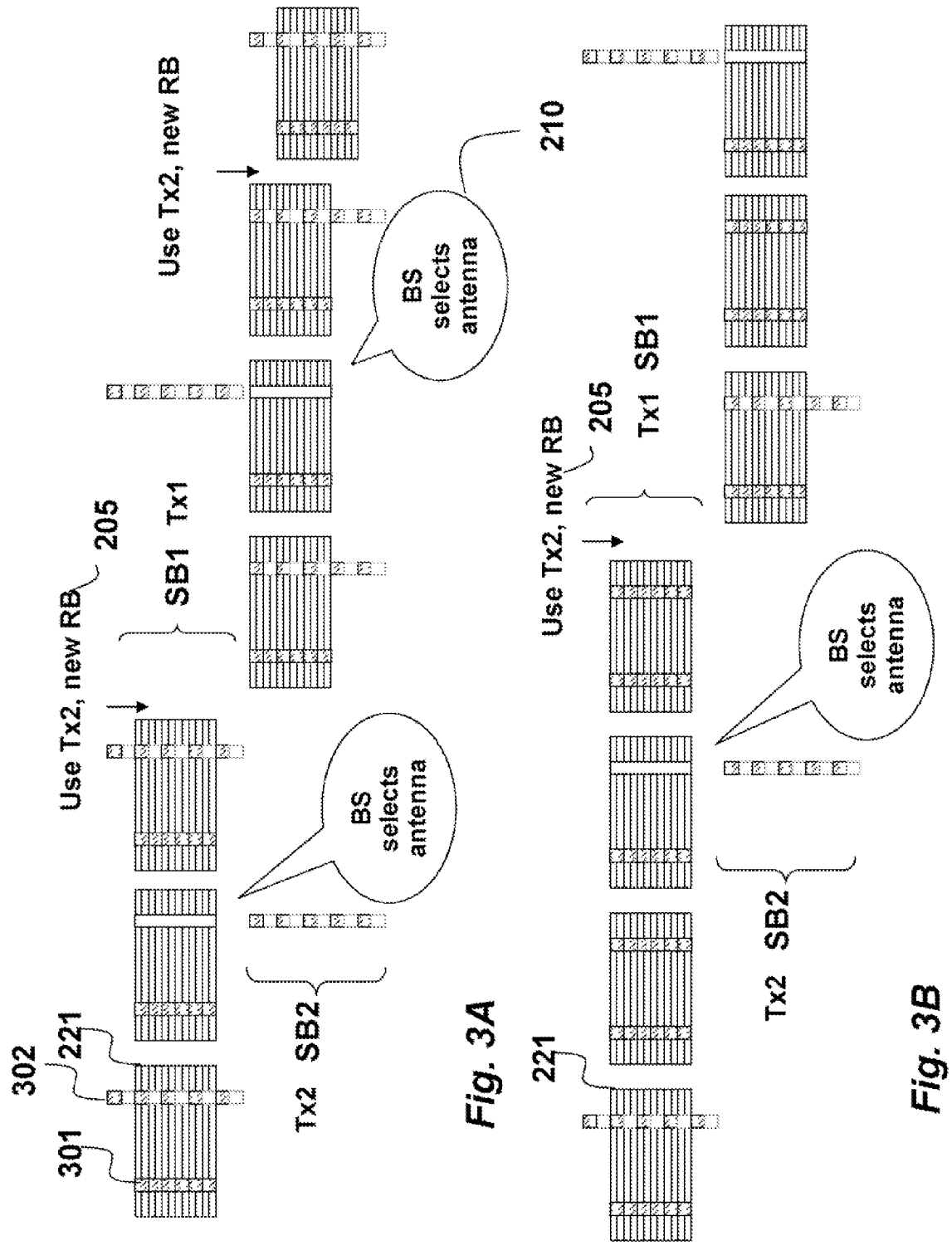

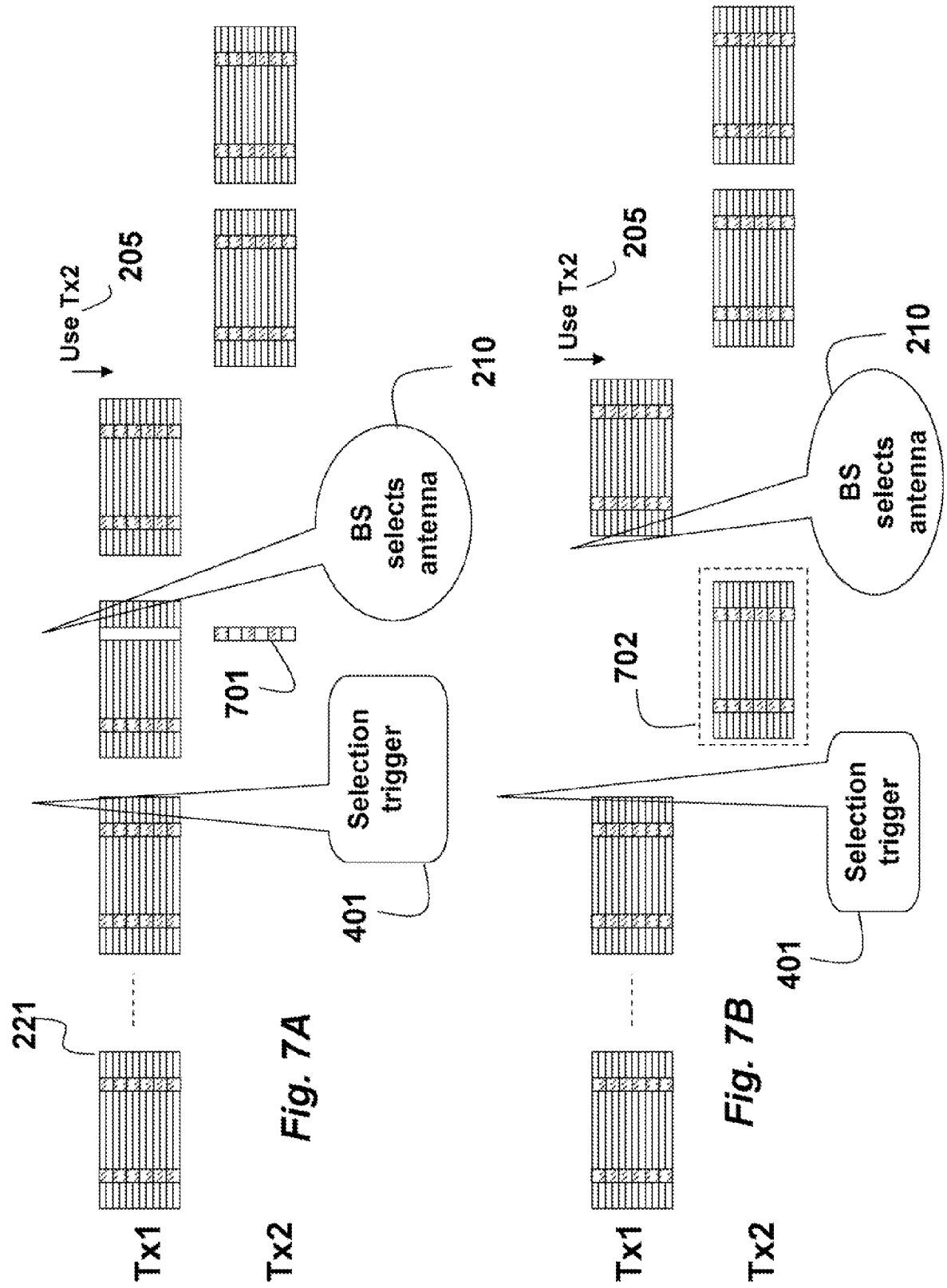

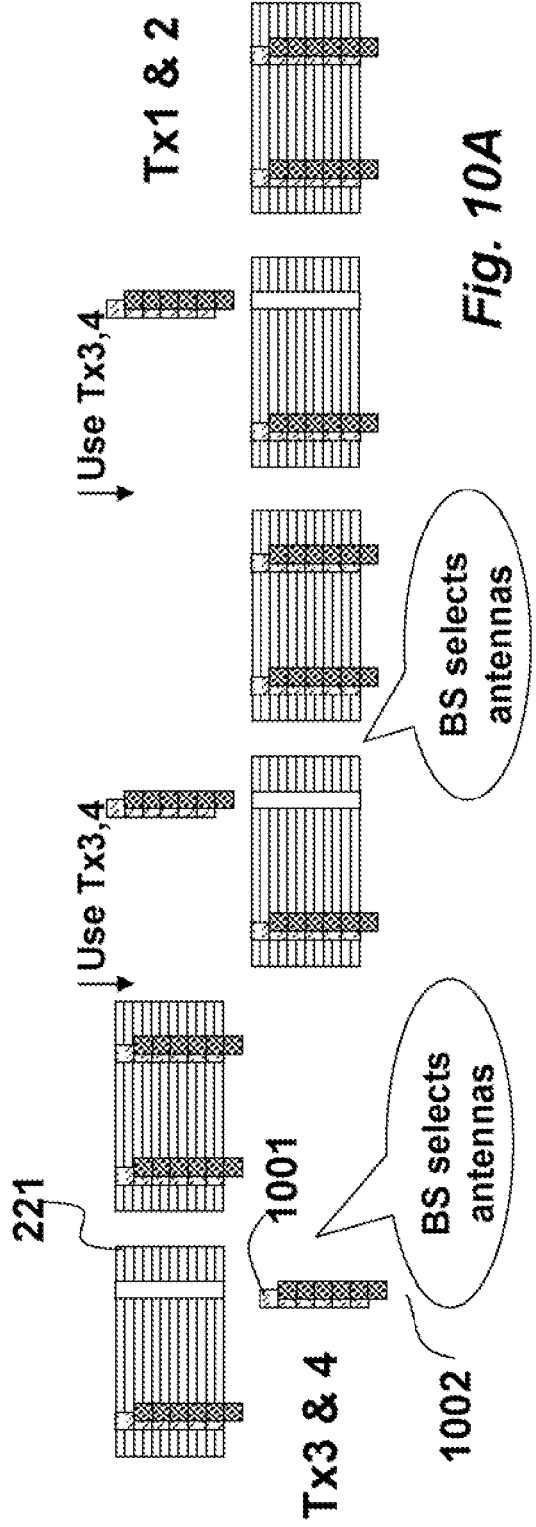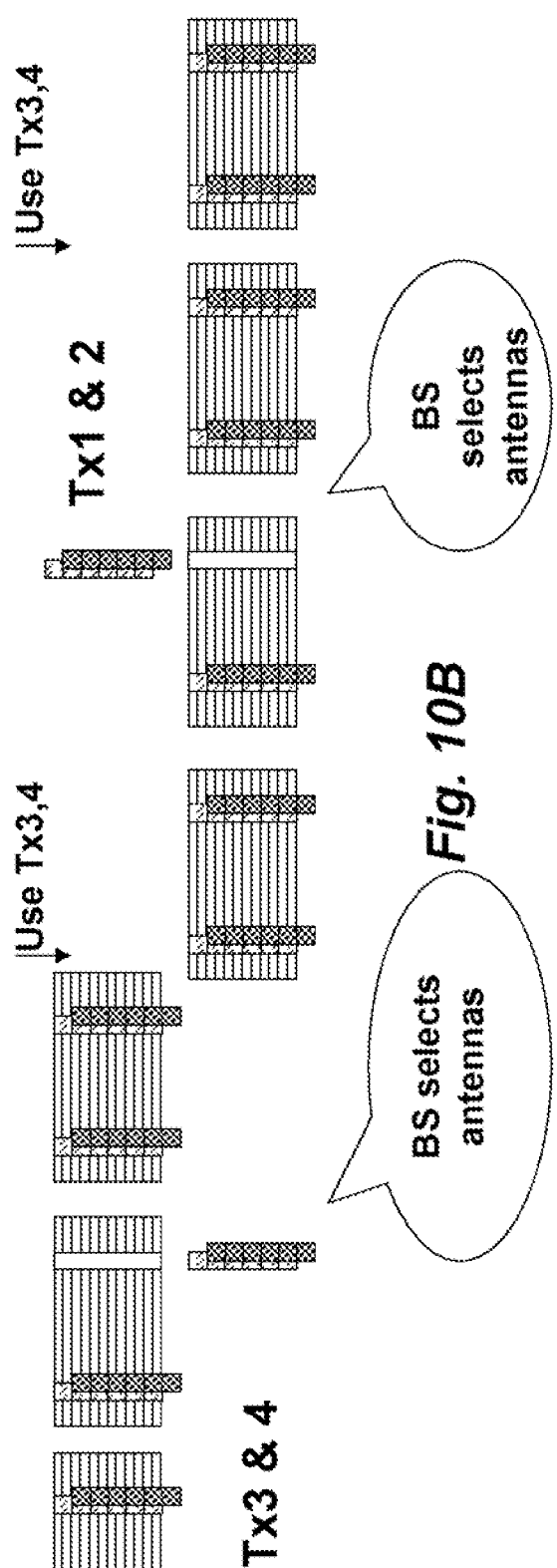

1400

1500

METHOD AND SYSTEM FOR ANTENNA SELECTION IN WIRELESS NETWORKS

RELATED APPLICATIONS

This application is related to U.S. application Ser. No. 11/620,089 entitled "Method and System for Switching Antennas during Transmission Time Intervals in OFDMA Systems" co-filed herewith by Mehta et al., and incorporated herein by reference. This application claims priority under 35 U.S.C. 119(e) from Provisional Application U.S. Ser. No. 60/839,366, filed Aug. 22, 2006 by Mehta et al., which application is also incorporated herein by reference.

FIELD OF THE INVENTION

This invention relates generally to selecting antennas in wireless communications systems, and more particularly to selecting antennas in transceivers where the number of RF chains is less than the number of antennas.

BACKGROUND OF THE INVENTION

OFDM

In a wireless communication system, such, as the $3^{rd}$ generation (3G) wireless and its long term evolution (LTE), it is desired to concurrently support multiple services and multiple data rates for multiple users in a fixed bandwidth channel. One scheme adaptively modulates and codes symbols before transmission based on current channel conditions. Another option available in LTE which uses orthogonal frequency division multiplexed access (OFDMA), is to exploit multi-user frequency diversity by assigning different sub-carriers or groups of sub-carriers to different users.

MIMO

In order to further increase the capacity of a wireless communication system in fading channel environments, multiple-input-multiple-output (MIMO) antenna technology can be used to increase the capacity of the system without an increase in bandwidth. Because the channels for different antennas can be quite different, MIMO increases robustness to fading and also enables multiple data streams to be transmitted concurrently.

While MIMO systems perform well, they also can increase the hardware and signal processing complexity, power consumption, and component size in transceivers. This is due in part to the fact that each receive antenna requires a receive radio frequency (RF) chain, which typically comprises a low noise amplifier, a frequency down-converter, and an analog to digital converter. Similarly, each transmit antenna element requires an RF chain that comprises a digital to analog converter, a frequency up-converter, and a power amplifier.

Moreover, processing the signals received in spatial multiplexing schemes or with space-time trellis codes requires receivers where the complexity can increase exponentially as a function of the number of antenna.

Antennas Selection

Antennas are relatively simple and cheap, while RF chains are considerably more complex and expensive. Antenna selection reduces some of the complexity drawbacks associated with MI MO systems. Antenna selection reduces the hardware complexity of transmitters and receivers by using fewer RF chains than the number of antennas. In antenna selection, a subset of the available antennas is adaptively selected by a switch, and only signals for the selected subset of antennas are processed by the available RF chains. As used herein, a subset, in all cases, means one or more of all the available antennas in the set of antennas. Note, that invention also allows multiple subsets to be used. For example, there can be four antennas and one RF chain, or eight antennas and two RF chains, which includes four subsets.

In order to select the 'best' subset of antennas, all channels corresponding to all possible transmitter and receive antenna pairs need to be estimated, even though only a selected subset of the antennas is eventually used for transmission, Pilot Tones Antenna selection can use repetitive pilot tones. Let $N_t$ denote the number of transmit antennas, $N_t$ the number of receive antennas, and let $R_t=N_t/L_t$ and $R_t=N_t/L_t$ be integers. Then, the available transmit (receive) antenna elements can be partitioned into $R_t(R_t)$ disjoint subsets. The pilot repetition approach repeats, for $R_t \cdot R_t$ times, a training sequence that is suitable for an $L_t \times L_t$ MIMO system. During each repetition of the training sequence, the transmit (receive) RF chains are connected to different subsets of antennas. Thus, at the end of the $R_t \cdot R_t$ repetitions, the complete channel is estimated at the receiver.

in case of transmit antenna selection in frequency division duplex (FDD) systems, in which the forward and reverse links are not identical, the receiver feeds back the optimal subset of the selected antennas to the transmitter. In reciprocal time division duplex (TDD) systems, the transmitter can perform the selection by itself.

For indoor LAN applications with slowly varying channels, antenna, selection can be performed using a media access (MAC) layer protocol, see IEEE 802.1.1n wireless LAN draft specification, I. P802.11n/D1.0, "Draft amendment to Wireless LAN media access control (MAC) and physical layer (PHY) specifications; Enhancements for higher throughput," Tech. Rep., March 2006.

Instead of extending the physical (PHY) layer preamble to include the extra training fields (repetitions) for the additional antenna elements, antenna selection training is done by the MAC layer by issuing commands to the physical layer to transmit and receive packets by different antenna subsets. The training information; which is a single standard training sequence for a $L_t \times L_t$ MIMO system, is embedded in the MAC header field.

OFDMA Structure in LTE

The basic uplink transmission scheme is described in 3GPP TR 25.814, v1.2.2 "Physical Layer Aspects for Evolved UTRA." The scheme is a single-carrier transmission (SC-OFDMA) with cyclic prefix (CP) to achieve uplink inter-user orthogonality and to enable efficient frequency-domain equalization at the receiver side.

SUMMARY OF THE INVENTION

A method and system selects a subset of antennas from a set of antennas to transmit user data in a wireless communication system. The user data is transmitted during a first transmission time intervals (TTI) using a first subset of antennas. Pilot tones are transmitted during a second TTI using a second subset of antennas.

Corresponding channel qualities are estimated for the first subset of antennas and the second subset of antennas from the user data and the pilot tones. Then, based on the estimating, a best subset of antenna is selected from the first subset of antennas and the second subset of antennas to transmit the user data during a subsequent TTI.

BRIEF DESCRIPTION OF THE DRAWINGS

FIG. 1B-1E are block diagrams of transmit time intervals according to embodiments of the invention;

FIG. 1F is a block diagram of a resource block according to an embodiment of the invention;

FIG. 2-13 are block diagrams of data and antenna selection signals according to embodiments of the invention;

DETAILED DESCRIPTION OF THE PREFERRED EMBODIMENTS

The embodiments of the invention provide a method and system for generating and transmitting training signals for antenna selection in wireless networks. More specifically, the invention can be used in transceivers where the number of RF chains is less than the number of antennas, e.g., one transmit RF chains for two transmit antennas, or two transmit RF chains for four transmit antennas. It should be understood that the antennas can also be coupled to corresponding fewer receive RF chains. It should be noted that the techniques describe herein can be worked with receivers that have only a single antenna. The invention is applicable to networks designed according to 3GPP, 4G cellular, WLAN, WiBro, WiMAX, and IEEE 802.20 standards.

Figure 1A:
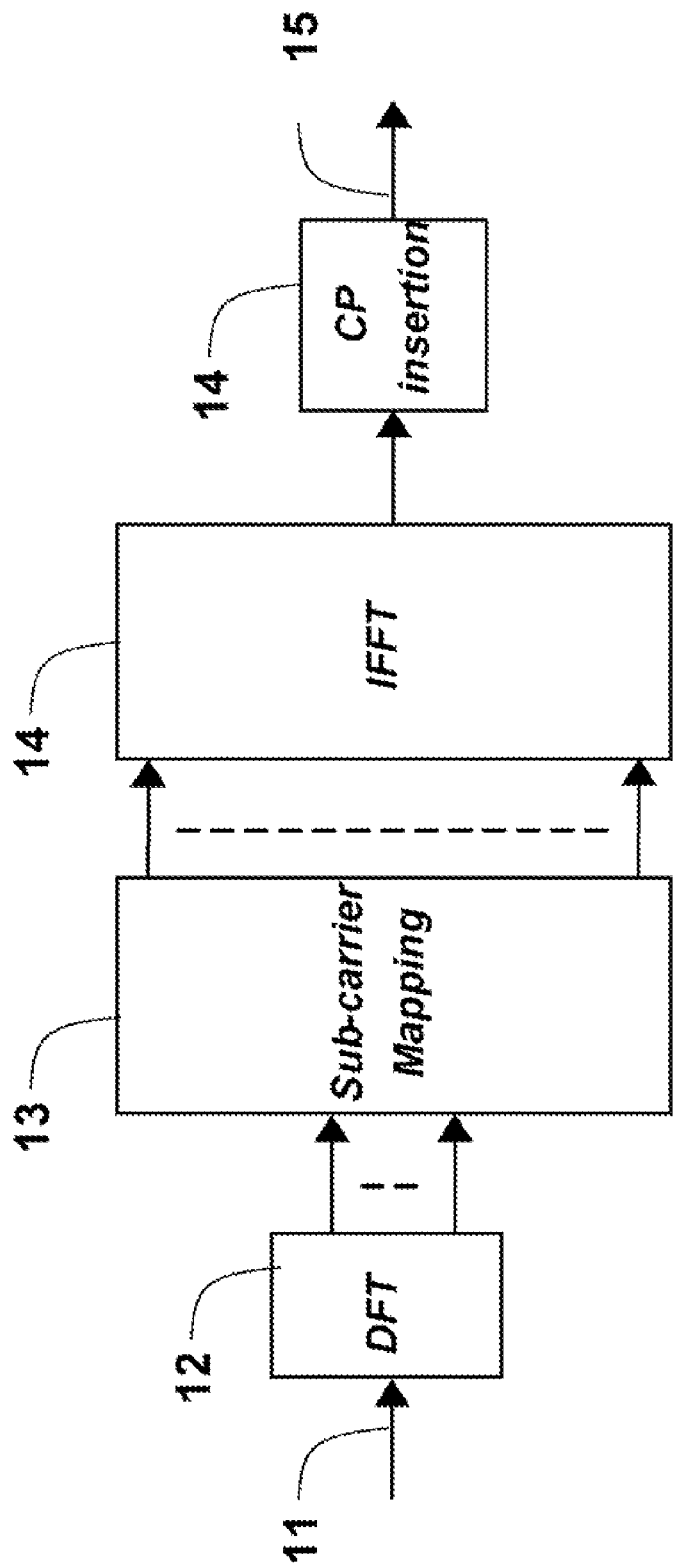
FIG. 1A is a block diagram of a transmit RF chain according to an embodiment of the invention.

FIG. 1A shows a portion of a transmit RF chain 10 for a discrete Fourier transform (DFT)-spread OFDM transceiver used by the embodiments of the invention. Symbols 11 are encoded using a DFT 12, followed by sub-carrier mapping 13, and an IFFT 14 followed by cyclic prefix (CP) insertion 14 to produce the transmitted signal 15. The sub-carrier mapping 13 determines which frequencies are used for transmission.

Figure 1B:
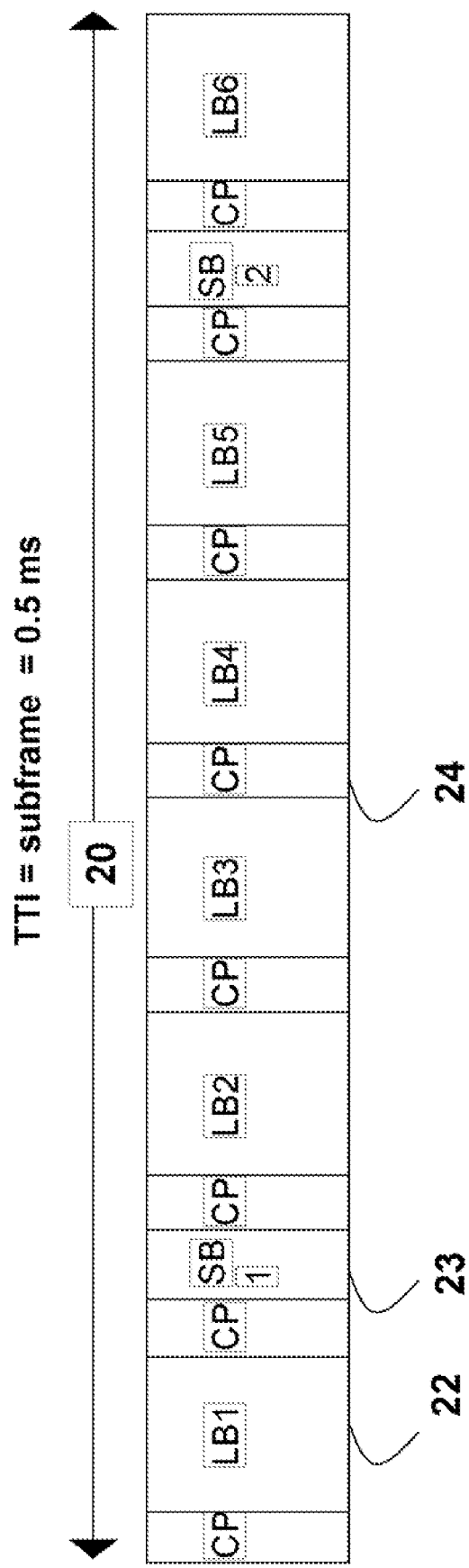

FIG. 1B shows the basic structure of a transmission subframe or time interval (TTI) 20. The transmission is divided into time slots of duration 0.5 ms. A radio frame is 10 ms long. Hereinafter, the term TTI and subframe are used interchangeably. A TTI includes of one or more time slots. The TTI 21 includes long blocks (LB) 22 and short blocks (SB) separated by CPs 24. In the case the TTI is 1.0 ms long, the subframe has 12 LBs and 4 SBs.

FIG. 1C shows a TTI with one time slot considered for 3GPP LTE. The TTI has a duration of 0.5 ms. The one time slot includes cyclic prefixes (CP) 24, long blocks (LB) 22, short blocks (SB) 330. The symbols in the short blocks can be used to transmit pilot tones 25. The long blocks are used to transmit information symbols (data). Thus, the TTI includes six LBs and two SBs.

FIG. 1C shows another 0.5 ms TTI with one time slot considered for 3GPP LTE. In this case, all the OFDM symbols are of the same length. One or more of the LBs in the time slot are used to transmit pilot tones, while the other LBS are used to transmit data. In effect, this TTI has of seven LBs.

FIG. 1E shows a TTI with multiple time slots 26. For example, the TTI is 1.0 ms and includes two time slots. The time slots can be as in FIGS. 1C and 1D.

FIG. 1F shows the basic structure of a resource block (RB) 21 during the transmission time interval (TTI) 20 according to an embodiment of the invention. The RB is partitioned into the long blocks (unshaded) 22 and the short blocks (shaded) 23, e.g., 6 or 12 long blocks, and 2 or 4 short blocks. The long blocks are used for control and data signals, and the short blocks are used for data modulation (DM) pilot signals, and antenna selection (AS) signals.

Another possible structure of the RB includes only long blocks and no short blocks, e.g., 7 LBs in a 0.5 ms slot. In this case, at least one LB is then used for the data modulation pilot and antenna selection signals. The signals in the short blocks are frequently referred to as "reference" or "pilot" tones. The DM and AS signals can be the same, it is only their use that differs. DM signals are used to demodulate the long blocks, and AS signals are used for channel estimation and antenna selection, it should be noted, that channel estimation in a receiver is well known. It should be noted that the invention is not limited to a specific number of long and short blocks during the TTI. For clarity the CPs are not shown in FIG. 1F.

The signals according to one embodiment of the invention can use orthogonal frequency division multiplexing (OFDM). This means that the frequencies of the signals, during a TTI, are spread over a wide bandwidth channel, e.g., 5 MHz or larger, using up to, e.g., 1024 sub-carriers or more. Typically, a RB includes a subband of 12 or 24 sub-carriers. Multiple subbands can be assigned to a particular user. The frequencies can be consecutive or interleaved.

To enable antenna selection for an the uplink from user equipment (UE) to a base station (BS), the UE transmits pilot tones from a set of available transmit antennas. The BS estimates the channels, selects an optimal subset of the transmit antennas, and feeds back information related to the selected subset of antennas to the LIE. Then, the UE uses the selected transmit antennas for future transmissions to the BS. The selecting can be performed periodically, or on demand. In the later case, notification is required before training and selecting can commence. It should be noted, that the selection can be for the same antenna that was previously used.

Given that there are fewer RF chains than antennas, the pilot tones are transmitted by different subsets of antennas using frequency division multiplexing (FDM) or code division multiplexing (CDM) in a time division multiplexed (TDM) manner, consistent with the basic RB structure shown in FIG. 1C.

In the description below, we first consider UE with one RF chain and two transmit antennas, and FDM pilot tones. These schemes are then extended for use with CDM pilot tones. Next, we consider two RF chains and four transmit antennas for both FDM and COM pilot tones. Further extensions based on this description are also possible.

We consider two cases of antenna training antenna training and selection occur within one TTI, and antenna training and selection occur between TTIs.

For each of these cases, we describe periodic and on demand antennas selection. We describe various alternative pilot tones for antenna selection, such as the data modulation (DM) pilot tone, the antenna selection (AS) pilot tones, broadband channel quality indicator (CQI) pilot tone, or hybrid schemes.

All of the training schemes described herein ensure that the overhead associated with training and selecting a subset of antennas is lower than the overhead associated with using all available antennas.

In the examples below for UE with, one transmit RF chain and two antennas (Tx1 and Tx2), we assume that one block, e.g., SB1, is used to transmit data, control and DM pilot signals, while the another (SB2) is used to transmit periodically AS signals for the slot structure with 6 LBs and 2 SBs. For the 1 ms TTI that includes LBs (and no SBs), LB11, for example, is used to transmit the DM pilot signals. The BS determines the channel state from the signals in the pilot blocks, and makes an antenna selection, decision, accordingly. For the purpose of this description, we assume that there is a delay between BS notification of the selection and the actual switching in the UE.

Training when Antenna Selection Occurs within a TTI

Using DM Signals

As shown in FIGS. 2A and 2B, antenna selection and training can be performed by generating the AS signal periodically. FIG. 2A shows antenna selection every second TTI, and FIG. 2B shows antenna selection every third TTI.

As shown in FIG. 2A, during a first TTI 220, the UE begins by transmitting most of the RB 221, including all long blocks and the DM 201 in SB1 with a selected antenna, e.g., the antenna Tx1 to be used is known to the BS, However, the AS signal 202 of the RB 221 is transmitted from an unselected antenna (Tx2) in SB2.

For the 1 ms TTI, which includes 3 slots with 2 LBs used for DM pilot signals, the UE begins by transmitting most of the RB, including all the LBs (1-3, 5-14) for data and LB4 for DM pilot. However, the AS signal of the RB is transmitted from an unselected antenna in LB11.

As shown, the AS signal 202 can be a "low overhead" signal because it either uses fewer reference signal carriers, e.g., half as shown in FIG. 2A, in the case of EDM pilot tones, or a lower power for CDM pilot tones, The BS select 210 a subset (one) of antennas using the DM signal 201 for Tx1 and the AS signal 202 for Tx2. Some time after making the selection, the BS feeds back the selection, e.g., "use Tx2 205," to the UE. The UE switches to the selected transmit antenna Tx2 for the next TTI after receiving the feedback. As shown in FIG. 2A and 2B, this training process is repeated periodically.

FIGS. 2A-2B also show that the overhead in terms of return path forwarding (RPF) for FDM pilot tones and power for CDM pilot tones can be made lower, because the estimation accuracy required for antenna selection is lower than required for coherent demodulation. The amount of overhead reduction involves a trade-off between selection accuracy and pilot tone overhead reduction.

Using Broadband CQI Pilot Tones

As shown in FIGS. 3A and 3B for the uplink channel; antenna training and selection can also be implemented using broadband CQI pilots 302, which are transmitted to enable channel selection and frequency domain allocation at the BS.

As shown in FIGS. 3A-3B, one block (SB1) is used for the data signals (long blocks) and the DM pilot tone 301 of most of the RB and the other block (SB2) is used for the CQI pilot tones 302. FIG. 3 A shows joint antenna selection and resource block assignment using the CQI pilot tone 302 when for every TTI. FIG. 3B shows joint antenna selection and resource block reassignment using the CQI pilot tone transmitted every multiple TTIs, e.g., two or more. Generally, the CQI pilot tones are transmitted in every TTI, or periodically every multiple TTIs.

This enables the BS to estimate the broadband frequency response of the channels for both antennas. Using the CQI pilot tone for training and selection has the additional advantage of enabling joint resource block carrier frequency reassignment and antenna selection, which improves the efficiency of frequency domain scheduling. The UE can switch transmit antennas as well as frequencies used in the RB.

On-Demand Adaptive Antenna Training and Selection

Figure 4:
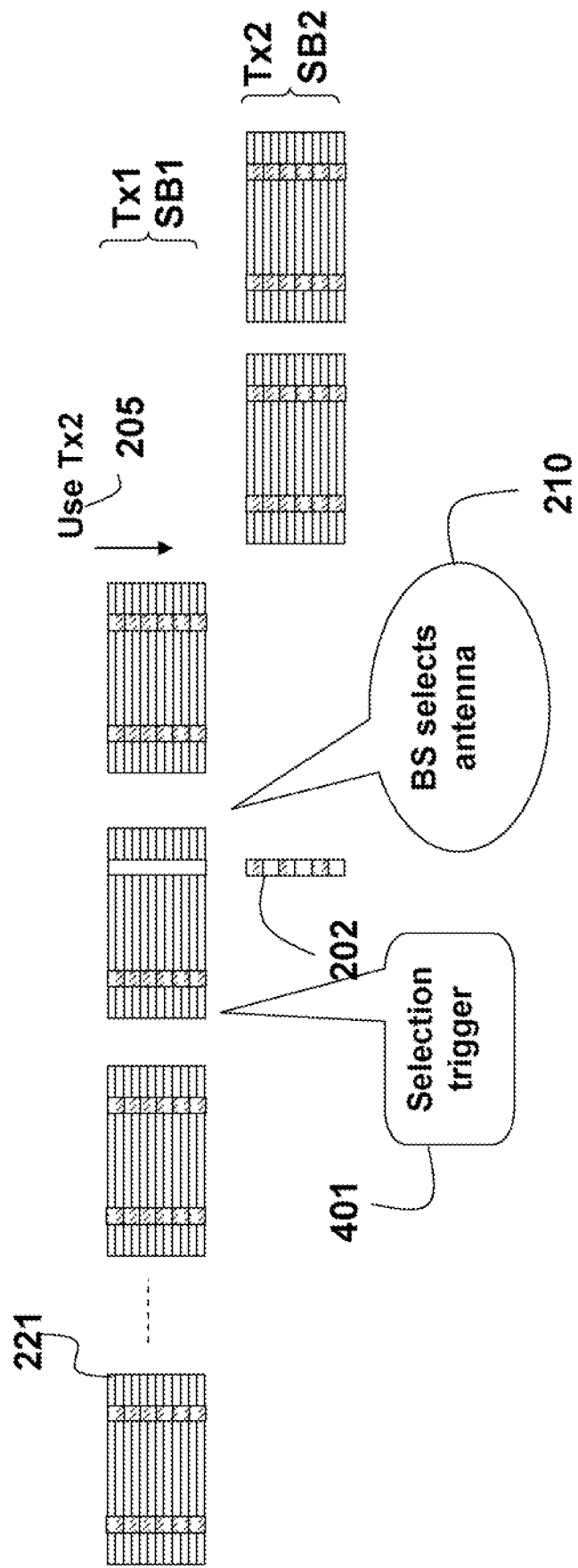

Instead of transmitting the AS signals periodically, the AS signals can be transmitted only when the performance of the current antenna falls below a desired threshold as shown in FIGS. 4. A history of signal interference and noise ratio (SINR) estimates, hybrid automatic repeat-request (HARQ) state, or modulation and coding scheme (MCS) processes can be maintained to determine when antenna selection is required. The history can be collected by either the UE or the BS.

After a decision has been made by either the UE or the BS to perform antenna training and selection, using e.g., a selection trigger signal 401, the UE transmits the AS pilot tone during the next TTI, by using either the AS signal 202 or the CQI pilot tone as described above. Then, the BS can estimate the state of the channels for both antennas, select an antenna, and send the decision 205 back to the UE. In this case, it helps if the UE explicitly informs the BS about the form of the AS signal.

Training when Antenna Selection Occurs between TTIs

We now describe the corresponding cases when antenna training and selection occurs between TTIs and not within a TTI as described above. Selecting between TTIs further simplifies the implementation complexity at the UE, with some extra delay in selecting the best subset of antennas.

Using Entire TTIs

Figure 5:
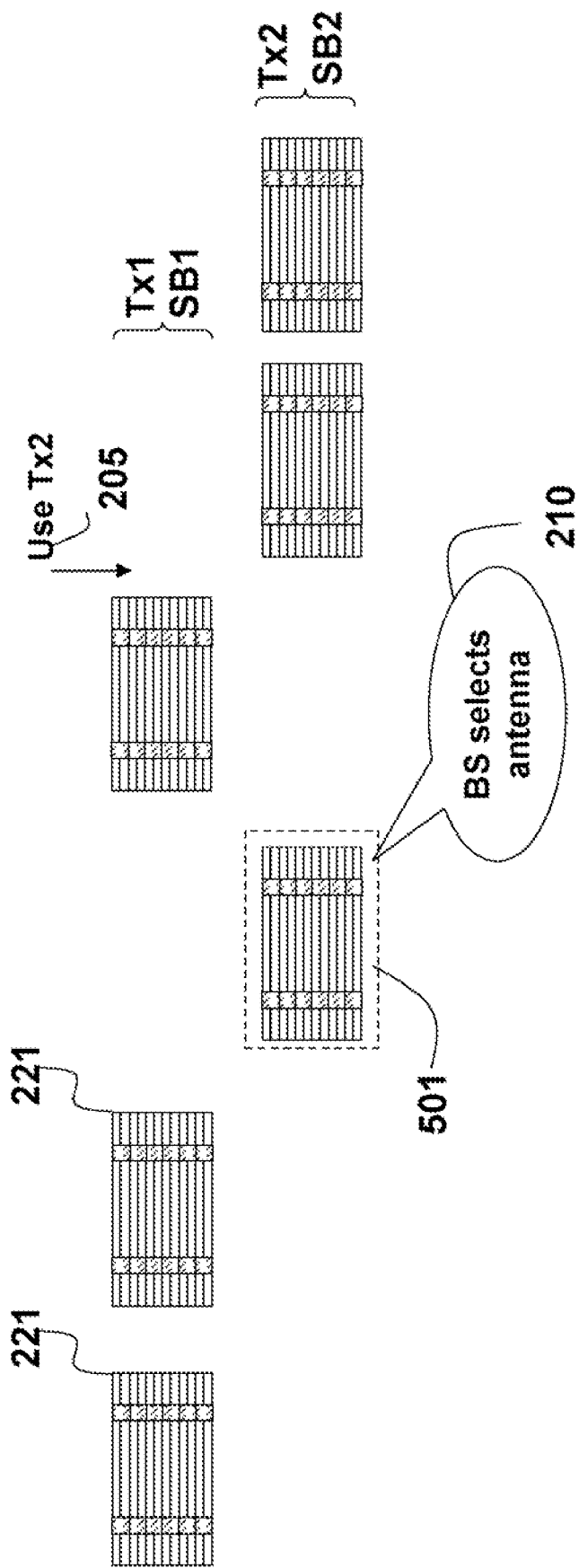
Figure 6:
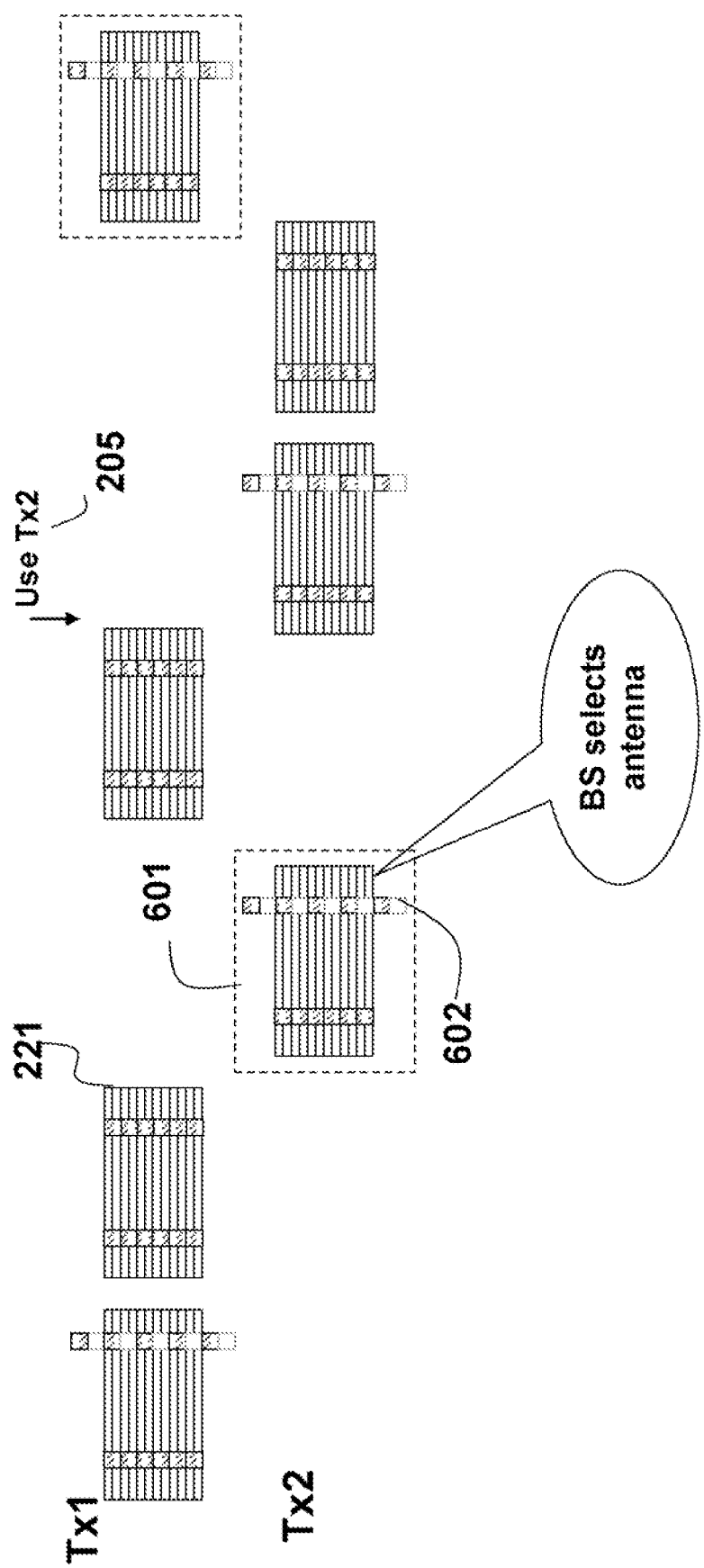

FIG. 5 and 6 show how transmitting of antenna selection and training can be implemented when the UE can only switch antennas between TTIs. The UE transmits the RBs 221 normally using the selected antenna. The RB 501 is transmitted periodically using the unselected antenna Tx2. By using the channel estimates from the previous TTIs, the BS can now select 210 the best antenna for the UE, and feed back its decision Tx2 205 back to the UE, This mechanism shows that a TTI can be used for antenna training and selection, as well as user data transmission.

FIG. 6 shows the same process for CQI pilot tones 602. TTI 601 that is transmitted with the unselected antenna includes data and the broadband CQI pilot tones 602, and DM pilots, if present. As described above, using the TTI with the CQI pilot tones also enables a joint resource block reassignment and antenna selection. It should be noted, that the periodicity of using the unselected antenna can vary from what is described above.

However, the transmission with the unselected antenna Tx2 needs to be done with a conservative lower rate MCS because the channel for Tx2 may not be known at either the BS or UE. The RB that is transmitted with the unselected antenna includes data and pilot tones. While the initial transmission with the unselected antenna requires a conservative choice of the MCS, channel statistics coupled with the latest channel estimate can be used to obtain a more reliable, and perhaps Jess conservative MCS choice for subsequent transmissions of RBs from the unselected antenna.

On-Demand Adaptive Training

FIGS. 7A and 7B show on-demand adaptive antenna selection in response to the selection trigger 410. The UE transmits using the selected antenna (Tx1) until its performance falls below a pre-determined threshold, measured as described above. The UE sends the trigger signal 410, and in the next TTI the UE initiates training by either sending just the AS pilot 701 with the unused antenna as shown in FIG. 7A, or the entire RB 702 as shown in FIG. 7B.

In one embodiment, the UE reverts back to Tx1 for the subsequent TTI, and for the select signal 205. In another option, the UE continues to use Tx2, unless the BS directs the UE to switch to another antenna.

Multiple Antenna Subset Selection

In the examples below, we describe how antenna selection can be implemented in a UE with two RF chains and four transmit antennas. With two RF chains, the reference signals of two antennas are sent simultaneously in a FDM or CDM manner as described above. The reference signal sub-carriers for the different antennas are shown using two different patterns.

With FDM Pilots

Figure 8A:
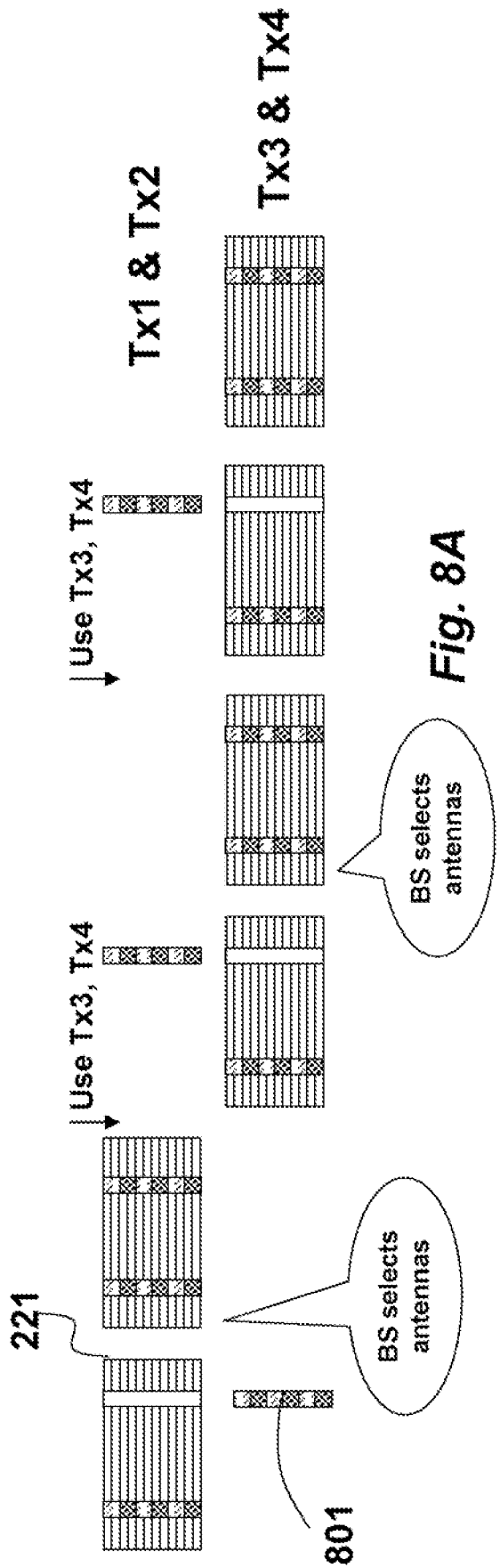
Figure 8B:
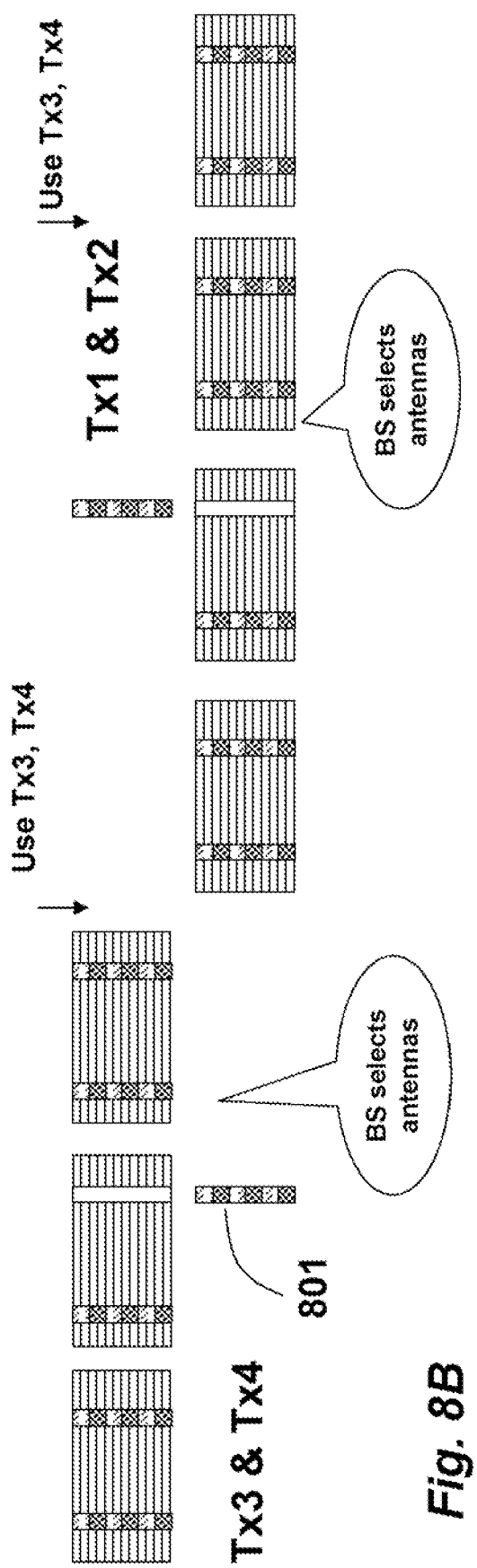

As before, we describe antenna selection using the AS pilot tones or the broadband CQI pilot tone. FIG. 8A shows periodically sending the AS signal 701 during every other TTI via a pair of unselected antennas (Tx3 and Tx4), while FIG. 8B shows the AS signal in every third TTI.

With CDM Pilots

Figures 9A, 9B:
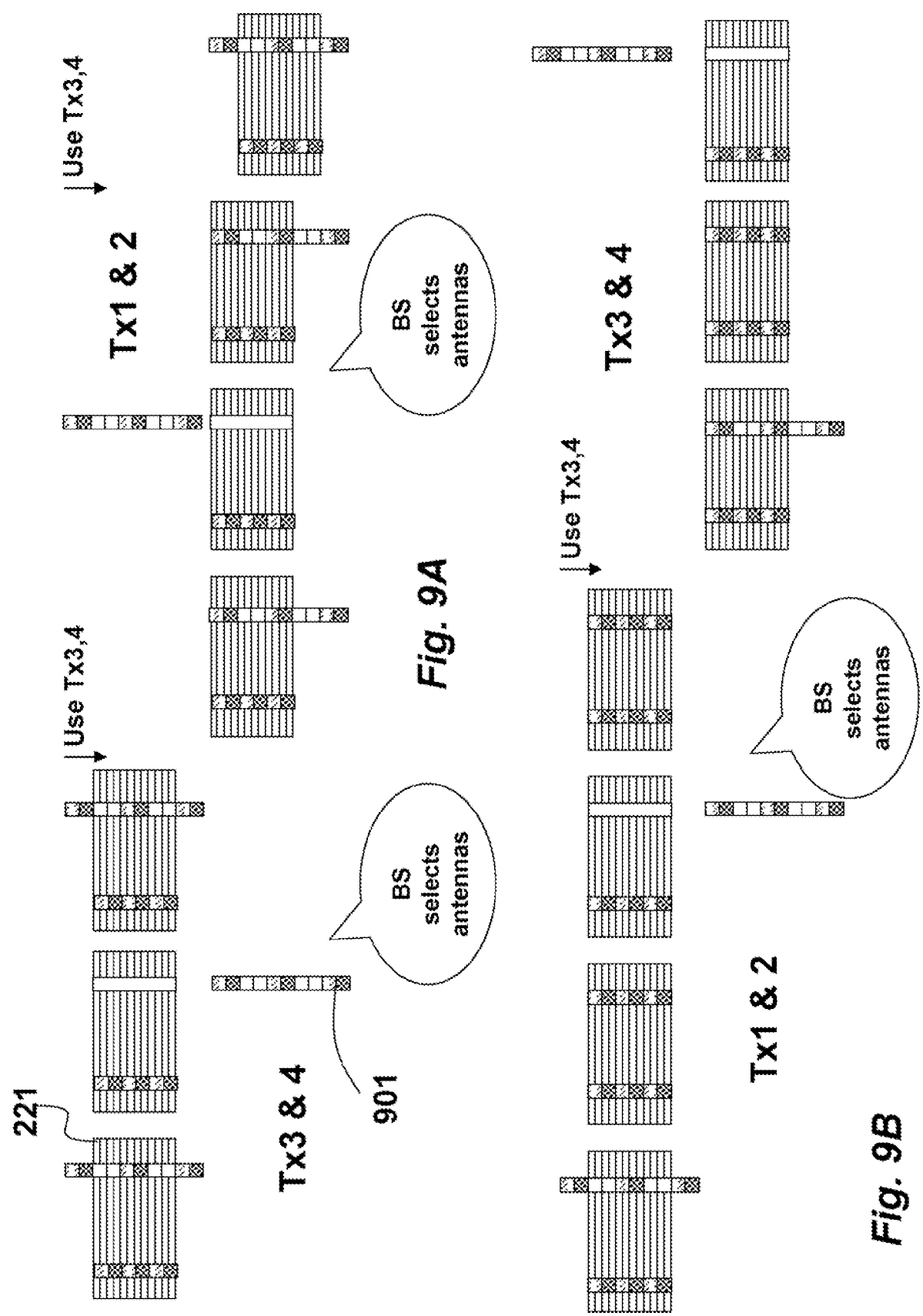

FIGS. 9A-9B show antenna training and selection with periodic FDM broadband CQI pilot tones 901 and RB reassignment. For every other TTI and every third TTI, respectively using a pair of unselected antennas, e.g., Tx3 and Tx4.

FIGS. 10A-10B show antenna subset selection by using periodic CDM data modulation pilot tones 1001. In this case, the two pilots 1001-1002 transmitted simultaneously are orthogonal to each other. Similar schemes exist when the UE switches between TTIs, and for on demand (adaptive) antenna selection.

Antenna Training for One RF Chain and Four Transmit Antennas

Figure 11:
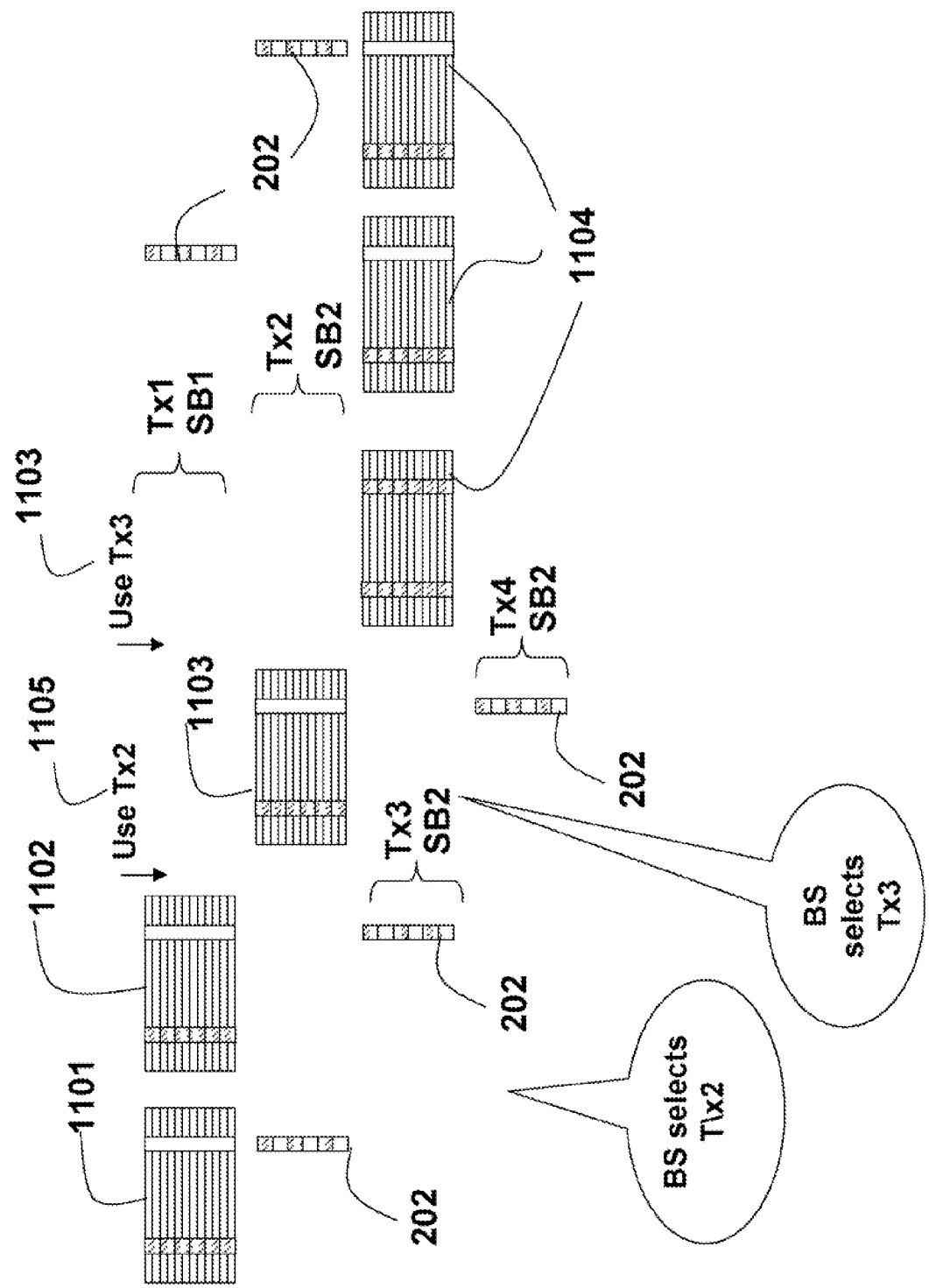

An embodiment for one RF chain and four antennas is shown in FIG. 11. The UE transmits the training information for four antennas, such that only one transmit antenna is active at any one time. We describe three options, although other generalizations and combinations are also possible.

As shown in FIG. 11, the UE sends a data packet in the first TTI 1101 from Tx1, and uses SB2 to send the AS signal 202 for Tx2. Then, the BS can determine which of the antennas Tx1 and Tx2 is better, and feeds its decision, e.g., use Tx2 1105, back to the UE. This feedback, is received by the UE after the third TTI. In the meantime, the UE retransmits the second data packet in the second TTI 1102 from Tx1, and uses SB2 of the RB to send the AS signal for Tx3. Then, the transmitter switches to Tx2, as earlier indicated by the BS, and transmits the third data packet in TTI 1103 using Tx2. In the same TTI, the UE uses the SB2 to send the antenna selection pilot tone for the last remaining antenna Tx4. Then, the BS determines, for example, that Tx3 is the best of ail four antennas, and indicates to UE to transmit using Tx3. The UE then transmits the data, packets 1104 using Tx3 1103. A similar mechanism can be described for the 1 ms TTI with 14 LBs in which 2 LBs carry reference signals.

Note that the BS updates its selection decision and feeds the decision back while estimating the channels from the different antennas. In one embodiment, the BS only feed back its final decision, without incremental selection updates. In this case, the feedback to use Tx2 is absent, and the UE transmits the third TTI using Tx1.

Figure 12:
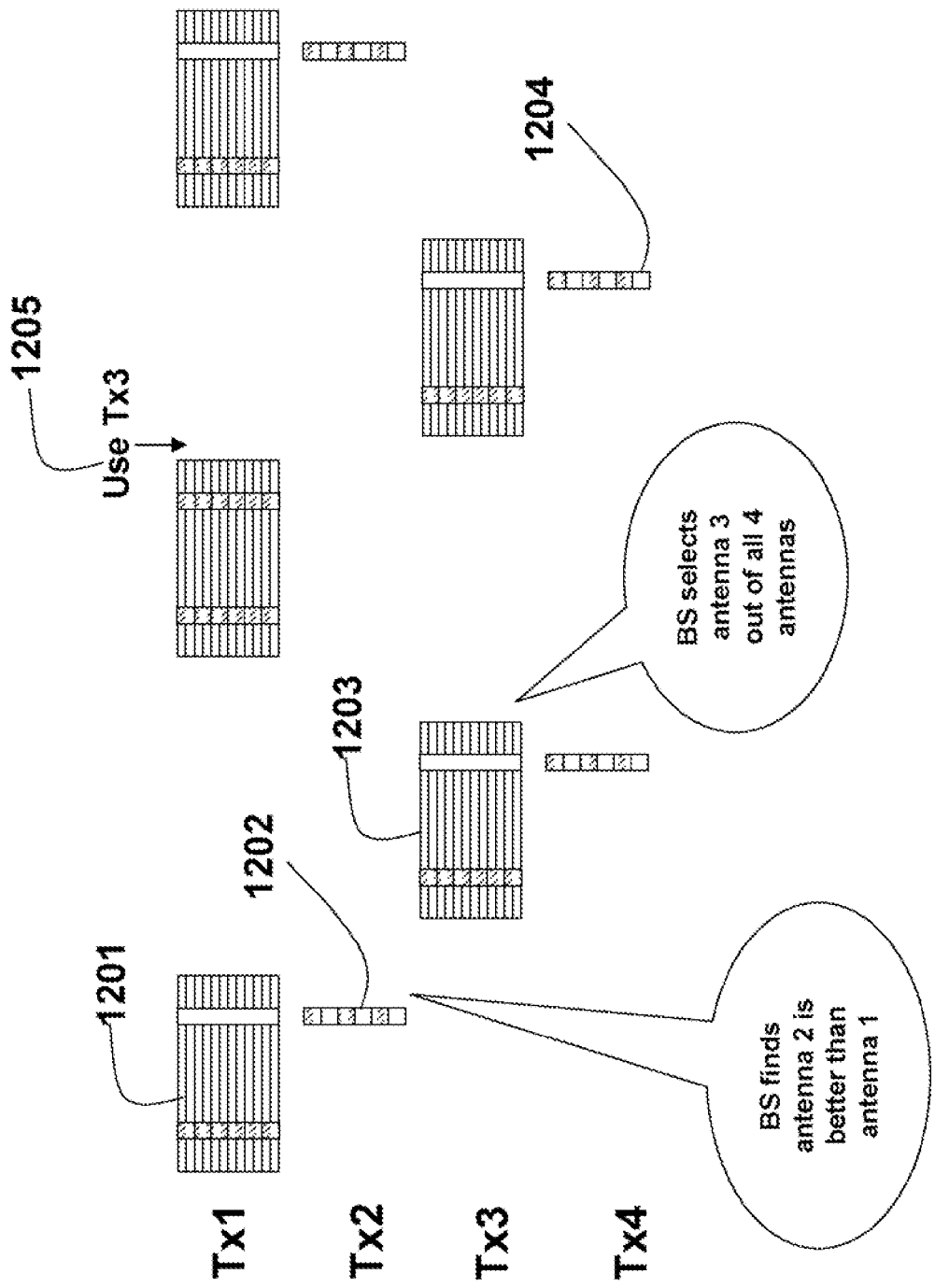

FIG. 12 shows another option to speed up the selection process. This option uses a combination of selecting within a TTI and selecting between TTIs. The UE transmits a data packet using antenna Tx1 in the first TTI 1201, and uses SB2 to send the AS signal 1202 from antenna Tx2. Then, the UE switches to antenna Tx3 to transmit the data packet in the second TTI 1203, and sends the AS signal 1204 for antenna Tx4 in SB2.

Then, the BS can determine and compare the channels from all the four transmit antennas and feeds back its selection decision to the UE, e.g., Tx3 1205. The UE continues to transmit data packets from antenna Tx1, while waiting for the selection decision, and switches to antenna Tx3 thereafter.

Figure 13:
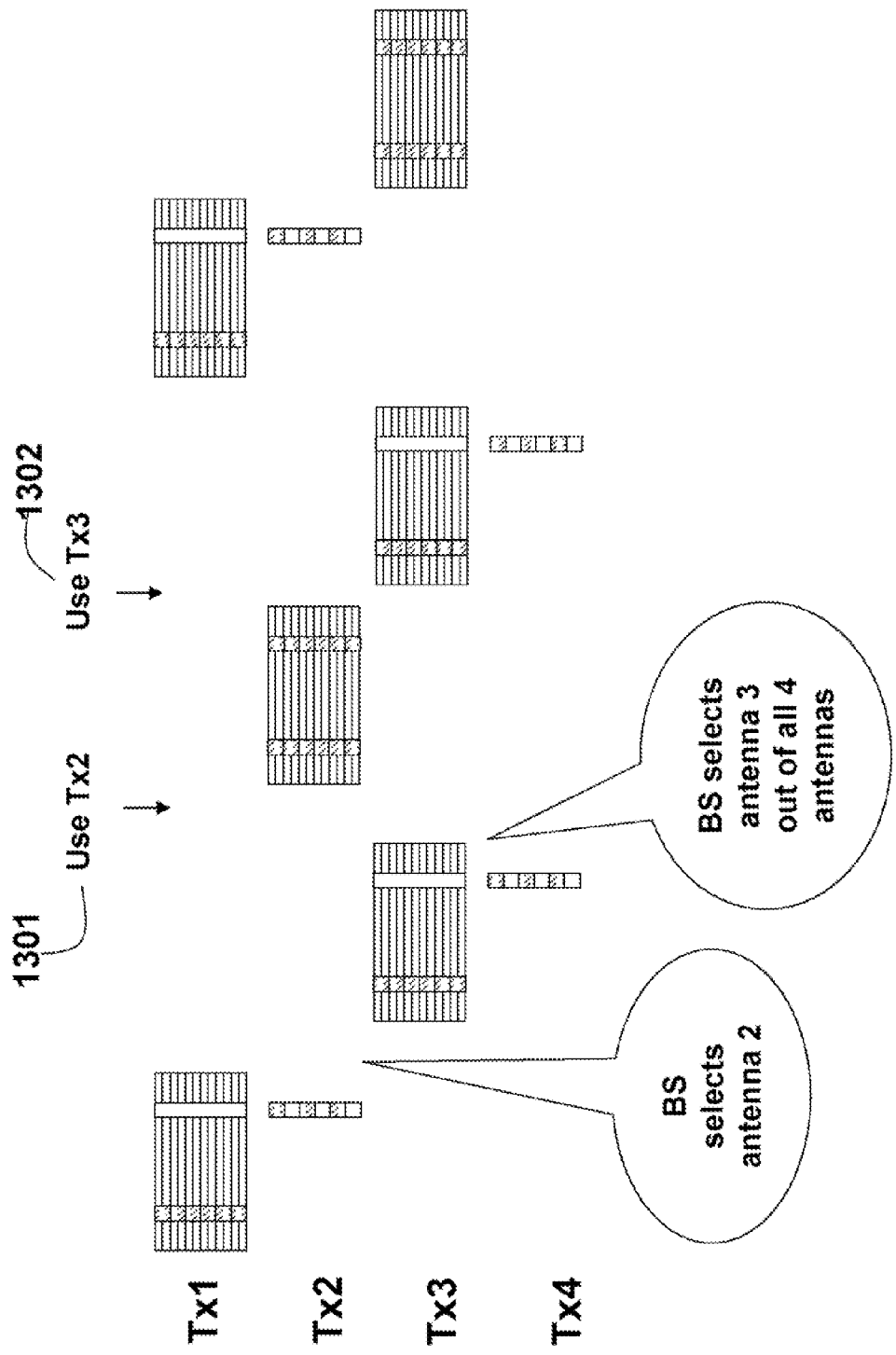

Alternatively as shown in FIG. 13, the BS send an incremental update when the BS can estimate only a subset of the channel states of the multiple available antennas. The BS compares the channel for antennas Tx1 and Tx2 after the first TTI and sends its selection decision 1301 back to the UE. For example, the BS selects Tx2 1301. This decision is received by the UE after the second TTI. In the second TTI, the UE, as before, uses antenna Tx3 to transmit its data packet and antenna Tx4 for the AS signal. However, in the third TTI, after receiving the BSs selection decision, the UE switches to Tx2 to transmit the data packet. As before, the BS can compare all the four antennas after the second TTI, and send it selection decision, e.g., Tx3 1302, back to the UE, The UE switches to Tx3 after the third TTI.

Using AS Packets

Stand Alone AS Packets

Figure 14:
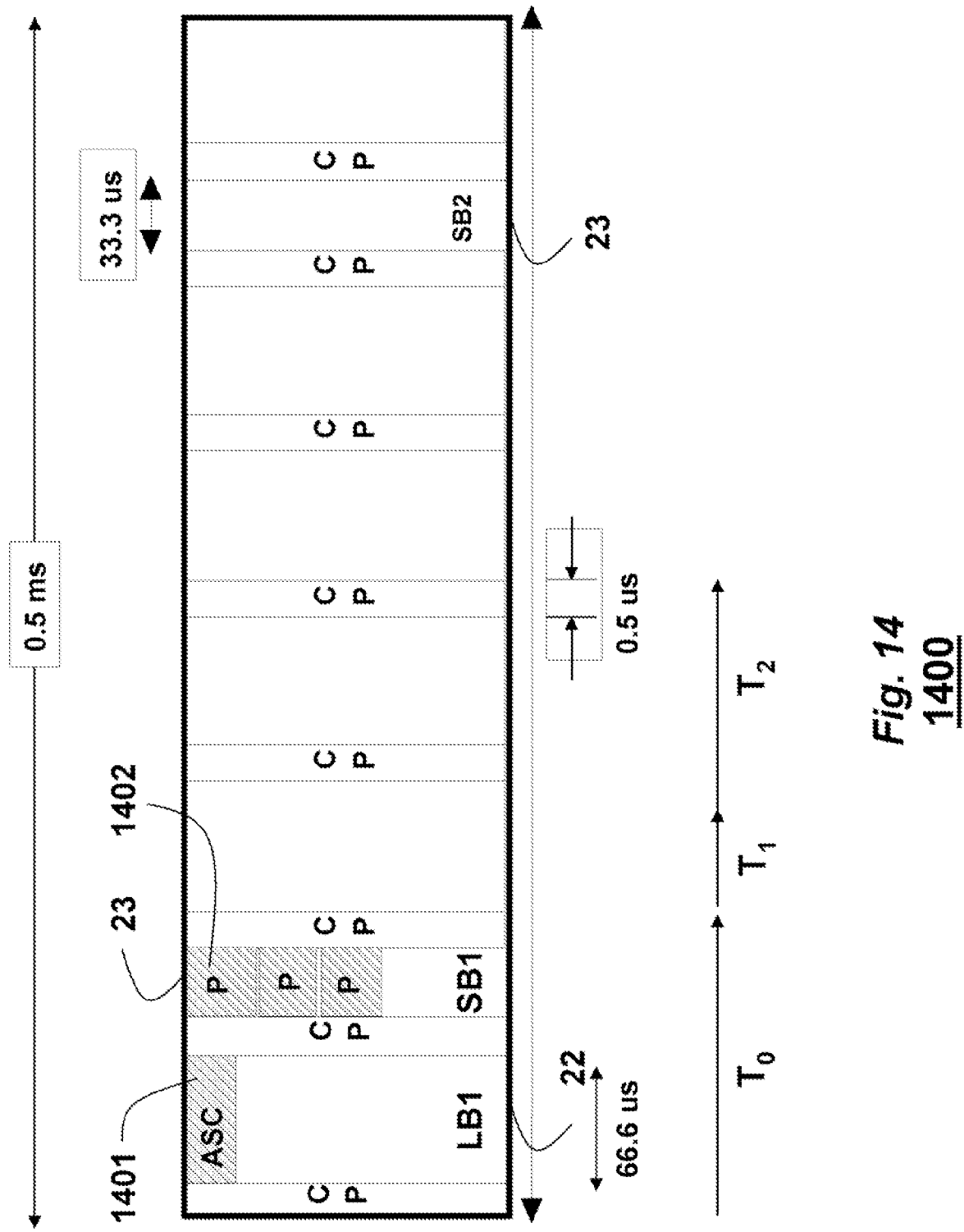
FIGS. 14 and 15 are block diagrams of antenna selection packets according to an embodiment of the invention.

In addition to the embodiments described above, the antenna selection process can also use an antenna selection (AS) packet 1400 as shown in FIG. 14. The AS packet embeds antenna selection control (ASC) information 1401 in, e.g., the first long block (LBl) and the DM pilot (P) signal 1402 in the first short block SB1 in case of a slot with 2 SBs, or in LB4 in case of a TTI with 14 LBs. This type of operation is very suitable for traffic in bursts, as selection can be done just before a transmission burst. The ASC information can indicate which antenna is being used by the UE. Thus, the BS can directly associate its channel estimate with a specific antenna. In addition, the control information can also indicate that the UE requests antenna selection, and that pilot tone in the second short block SB2 should be used for training by the BS.

As shown in FIG. 14, the BS does not need to receive the pilot tones before selecting an antenna. The BS can select immediately after receiving the first two OFDM symbols of the uplink TTI. This involves the following specific steps and timing delays. The BS receives the first and second OFDM symbols of the UL TTI from the UE and performs channel estimation and antenna selection with, delay $T_0$. There is negligible round trip propagation delay $T_1$ for a cell radii smaller than 10 Km. The first long and short blocks of the DL TTI are received by the UE and the UE then switches to the selected antenna with delay $T_2$.

Piggybacking AS Training

Figure 15:
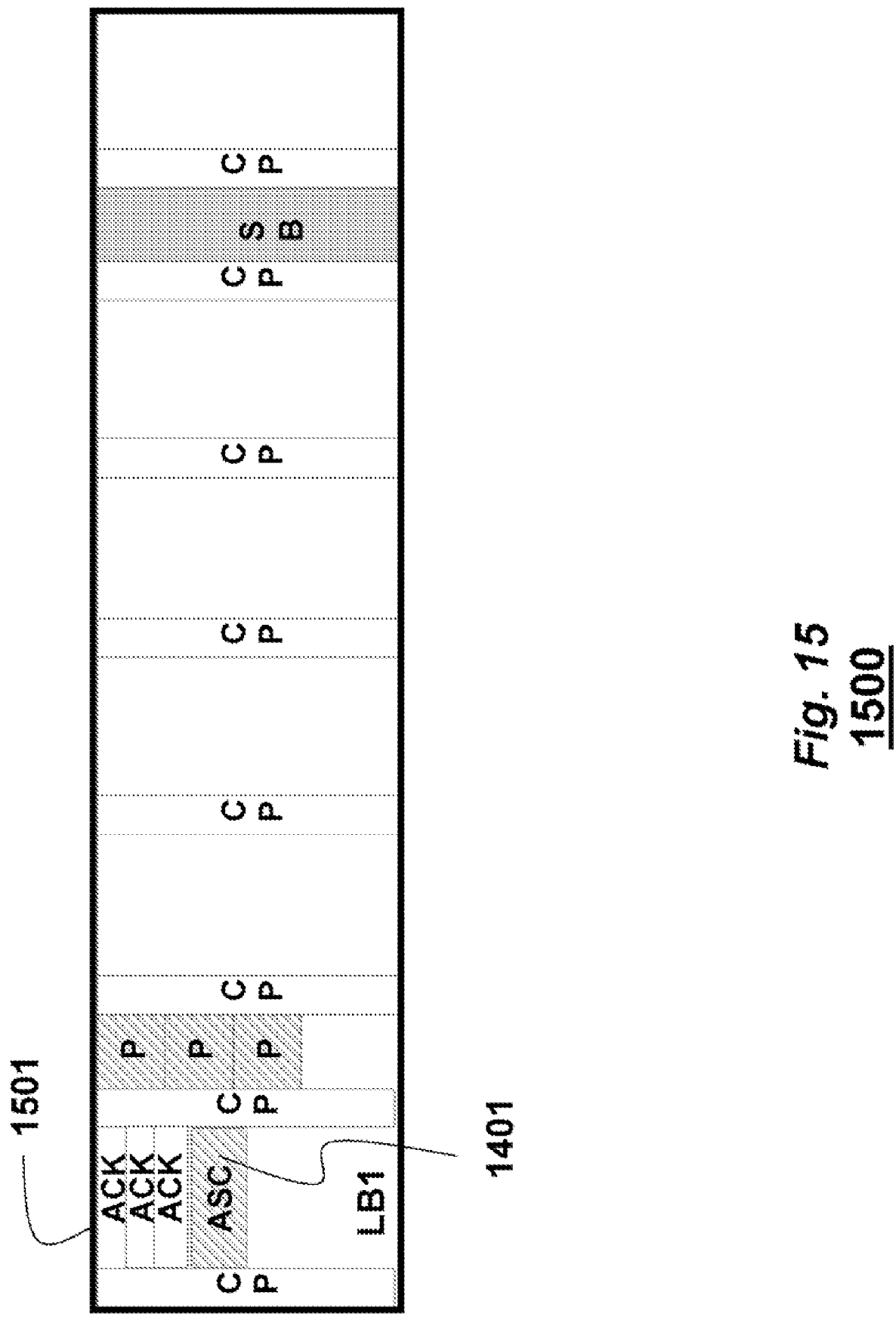

Alternatively as shown in FIG. 15, the UE can use control packets, such as packets with ACK or NACK 1501 in LB1, for antenna selection. This type of packet is sent on the uplink after the UE receives a packet from the BS, even when the UE has no other uplink packets to transmit to the BS. To decrease the overhead of antenna selection, the ACS field 1401 can be sent with some packets on otherwise unselected antennas. Therefore, the scheme requires no additional packets to be sent. The AS information can be piggybacked either in a periodic manner or adaptively, as described above. Furthermore, either the UE or the BS can initiate this process.

Antenna Selection Methods

Figure 16:
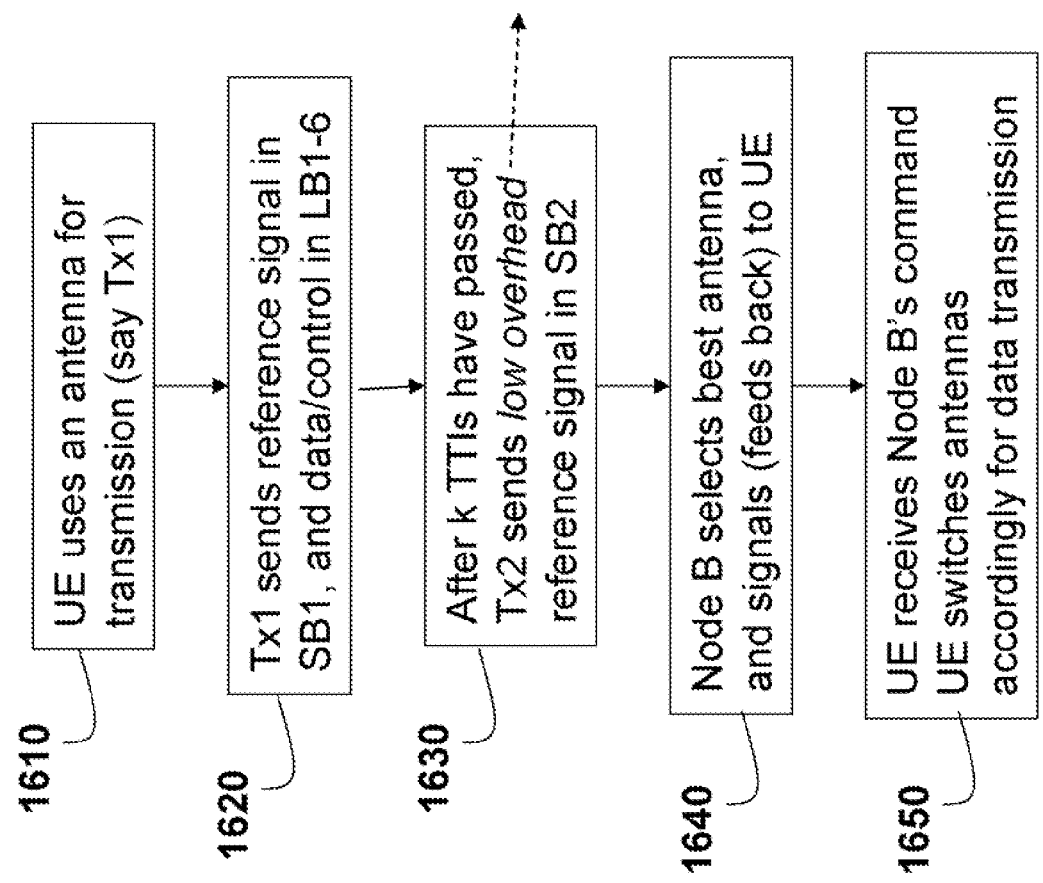
FIG. 16 is a flow diagram of an antenna selection method according to an embodiment of the Invention.

FIG. 16 shows an antenna selection method according to an embodiment of the invention. A first antenna is selected 1610 for transmitting signals from the UE to the BS, e.g., the selected antenna is the last used antenna. It is assumed that the selection is known to the UE and the BS. The UE transmits 1620 a data packet to the BS via the selected antenna (Tx1) during a TTI. The data (or control information) are carried in long blocks of the data packet.

The UE also transmits 1630 an AS signal, as described above, using an unselected antenna, e.g., Tx2, The sending of the AS signal can be periodic every k TTIs, or on demand. The AS signal is carried in a short block of the packet, or a subsequent data packet. The AS signal can be a FDM or CDM signal. As described herein, the AS signal can even be a low overhead signal. If the signal is a FDM pilot tone, then low overhead implies a smaller number of signal sub-carriers. For CDM pilot tones, low overhead signals have reduced power.

In response to receiving the data packet and the AS signal, the BS estimates the channel and selects an antenna, and transmits the selection to the UE in step 1640. In the case of CDM pilot tones, the BS can also reassign the carrier frequencies of the resource blocks used by the UE.

Then, after receiving the selection, and perhaps the RB reassignment, the UE switches to the selected antenna for transmitting subsequent packets.

If the antenna selection is on demand, the selection process can be initiated by either the UE or BS based on the S1NR, MCS, or HARQ history.

Figure 17:
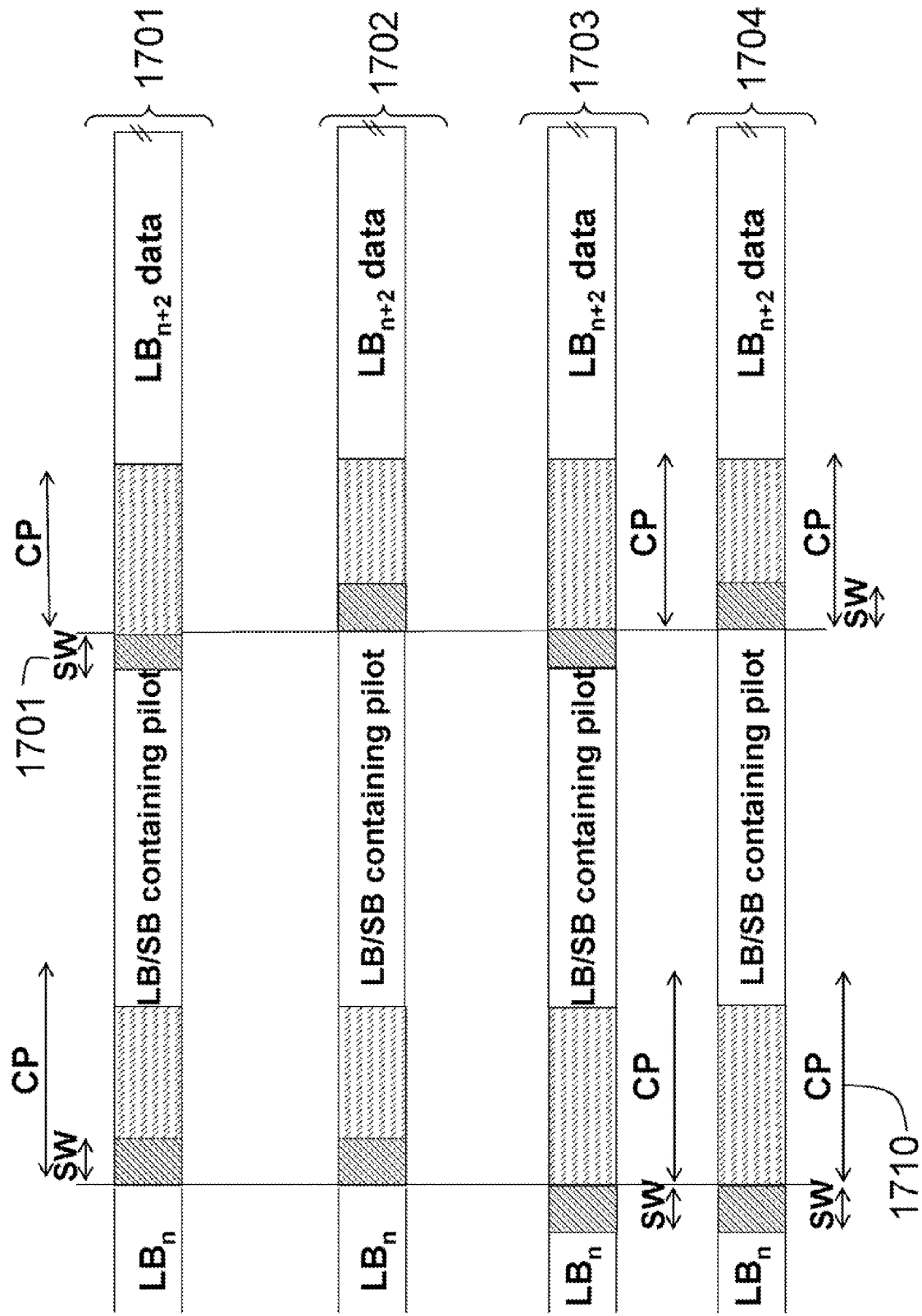
FIG. 17 is a block diagram of four antenna switching schemes according to embodiments of the invention.

FIG. 17 shows four ways that antennas can be switched 1701 after they have been, selected. The time required to switch antennas can be measured, in terms of nanoseconds, e.g.. 10 to 100 nanoseconds depending on the exact implementation. This is orders of magnitude shorter than the length of the symbol, e.g., 10 ms, Therefore, in one embodiment of the invention, the antennas are switched 1701 substantially between, the symbols. That is, the switching can. take place at the end of the block of the previous symbol, or at the beginning of the CP of the next symbol.

The four ways include switching entirely within an LB/SB used to send pilot tones, and use CP 1710 and LB or SB data part for switching 1701; switching using CP of LB/SB used to send pilot tones and CP of adjacent LB—1702; switching using CP of LB/SB used to send pilot tones and CP of adjacent LB—1703; and switching using CP of adjacent LBs and not using the CP of the LB/SB used to send pilot tones—1704. Of the four methods described above, the first method, in which the LB/SB that contains pilot tones for transmission, is used for the switching times leads to the least loss in performance as data LBs are not affected.

Effect of the Invention

The embodiments of the invention provide for antenna selection in the uplink between user equipment and a base station in a MIMO network, where the number of RF chains in the UE is less than the number of antennas.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for selecting a subset of antennas from a set of antennas to transmit user data in a wireless communication system, comprising the steps of;
   transmitting the user data during a first transmission time interval (TTI) using a first subset of antennas;
   transmitting pilot tones during a second TTI using a second subset of antennas;
   estimating corresponding channel qualities for the first subset of antennas and the second subset of antennas from the user data and the pilot tones; and
   selecting, based on the estimating, a best subset of antennas from the first subset of antennas and the second subset of antennas to transmit the user data during a subsequent TTI.

2. The method of claim 1, in which the first TTI and the second TTI are the same.

3. The method of claim 2, in which the selecting is performed within the single TTI.

4. The method of claim 1, in which the estimating is for frequency domain scheduling.

5. The method of claim 1, in which the selecting is performed periodically.

6. The method of claim 1, in which the selecting is performed on demand.

7. The method of claim 6, in which on demand selecting depends on the channel qualities.

8. The method of claim 6, further comprising:
   maintaining a history of signal interference and noise ratio estimates to determine the on demand scheduling.

9. The method of claim 6, further comprising:
   maintaining a history of hybrid automatic repeat-request state to determine the on demand scheduling.

10. The method of claim 1, in which the selecting is performed after the second TTI.

11. The method of claim 1, in which the user data and pilot tones are transmitted as symbols, and each symbol including a cyclic prefix and a block of data signals, and further comprising:
    switching from the first subset of the antennas to the second subset of antennas substantially between transmitting two consecutive symbols.

12. The method of claim 1, in which the pilot tones are data modulation pilot tones.

13. The method of claim 1, in which the pilot tones are channel quality indicator pilot tones.

14. The method of claim 1, in which the pilot tones include data modulation pilot tones and channel quality indicator pilot tones.

15. The method of claim 1, in which the estimating is performed in a receiver of the user data and the pilot tones.

16. The method of claim of claim 1, in which the set includes four antennas, and the best subset includes one antenna.

17. The method 1, in which the user data and the pilot signals are transmitting by multiple subsets of antennas, and a subset of the best antennas are selected.

18. The method of claim 1, in which the selecting is based on an antenna selection control packet.

19. The method of claim 1, in which the selecting is based on a control packet.

20. The method of claim 19, in which the control packet is an ACK packet.

21. The method, of claim 19, in which the control packet is an NACK packet.

22. A system for selecting a subset of antennas from a set of antennas to transmit user data in a wireless communication system, comprising:
    means for transmitting the user data during a first transmission time interval (TTI) using a first subset of antennas;
    means for transmitting pilot tones during a second TTI using a second subset of antennas;
    means for estimating corresponding channel qualities for the first subset of antennas and the second subset of antennas from the user data and the pilot tones; and
    means for selecting, based on the estimating, a best subset of antennas from the first subset of antennas and the second subset of antennas to transmit the user data during a subsequent TTI.

* * * * *